United States Patent
Guenach et al.

(10) Patent No.: US 11,855,675 B2
(45) Date of Patent: Dec. 26, 2023

(54) SYSTEM AND METHOD FOR PROVIDING DISTRIBUTED COMMUNICATION

(71) Applicant: Imec vzw, Leuven (BE)

(72) Inventors: Mamoun Guenach, Vilvoorde (BE); Andre Bourdoux, Theux (BE)

(73) Assignee: Imec vzw, Leuven (BE)

( * ) Notice: Subject to any disclaimer, the term of this patent is extended or adjusted under 35 U.S.C. 154(b) by 137 days.

(21) Appl. No.: 17/505,396

(22) Filed: Oct. 19, 2021

(65) Prior Publication Data
US 2022/0140853 A1  May 5, 2022

(30) Foreign Application Priority Data
Nov. 4, 2020 (EP) .................................... 20205583

(51) Int. Cl.
*H04B 1/40* (2015.01)
*H04B 1/04* (2006.01)
*H04B 1/16* (2006.01)

(52) U.S. Cl.
CPC ............ *H04B 1/40* (2013.01); *H04B 1/0483* (2013.01); *H04B 1/1607* (2013.01); *H04B 2001/0408* (2013.01)

(58) Field of Classification Search
CPC ............... H04B 1/04; H04B 1/0483; H04B 2001/0408; H04B 2001/0416;
(Continued)

(56) References Cited

U.S. PATENT DOCUMENTS 7,715,864 B2 * 5/2010 Zangi ................. H04W 52/242
455/67.13
7,720,020 B2   5/2010 Larsson
(Continued)

FOREIGN PATENT DOCUMENTS

| EP | 2756619 A1 | 7/2014 |
|----|------------|--------|
| WO | 2008088862 A1 | 7/2008 |
| WO | 2011017463 A1 | 2/2011 |

OTHER PUBLICATIONS

Extended European Search Report and Written Opinion, Application No. EP20205583.6, dated Apr. 21, 2021, 13 pages.
(Continued)

*Primary Examiner* — Quochien B Vuong
(74) *Attorney, Agent, or Firm* — McDonnell Boehnen Hulbert & Berghoff LLP

(57) ABSTRACT

A system for providing distributed communication with respect to a user equipment is provided. The system includes multiple communication units for distributing the communication with respect to the user equipment, a communication management unit connected to at least a pan of the multiple communication units in a connection line for managing the distributed communication, a connection unit including loss-inserting properties for connecting the multiple communication units to the connection line, an amplifying unit for being arranged with respect to the connection units, and a scheduling unit. The scheduling unit is configured to determine power loss with respect to the units on the basis of the corresponding loss-inserting properties and/or to schedule at least one of the multiple communication units and/or the at least one amplifying unit m order to compensate for power loss with respect to the at least one connection unit.

20 Claims, 8 Drawing Sheets

(58) Field of Classification Search
CPC ........ H04B 1/1607; H04B 1/40; H04B 1/401; H04W 52/42; H04W 52/38; H04W 52/52; H04W 88/085; H04W 88/12; H04W 88/14; H04W 88/16
See application file for complete search history.

(56) References Cited

U.S. PATENT DOCUMENTS

| | | | | |
|---|---|---|---|---|
| 7,848,745 | B2* | 12/2010 | Hasegawa | H04W 24/00 455/67.11 |
| 8,428,033 | B2 | 4/2013 | Hettstedt et al. | |
| 8,761,060 | B2* | 6/2014 | Patel | H04W 52/325 370/310 |
| 9,473,198 | B1 | 10/2016 | Martin | |
| 10,334,534 | B2* | 6/2019 | Alpert | H04W 52/42 |
| 10,880,145 | B2* | 12/2020 | Shattil | H04B 1/69 |
| 2011/0269404 | A1* | 11/2011 | Hu | H01Q 1/246 455/67.11 |
| 2019/0238213 | A1 | 8/2019 | Sfar et al. | |
| 2019/0356361 | A1 | 11/2019 | Liang et al. | |
| 2020/0344035 | A1 | 10/2020 | Fackler et al. | |

OTHER PUBLICATIONS

Yan, Yan, Qiang Hu, and Douglas M. Blough. "Path selection with amplify and forward relays in mmwave backhaul networks." In 2018 IEEE 29th Annual International Symposium on Personal, Indoor and Mobile Radio Communications (PIMRC), pp. 1-6. IEEE, 2018.

Galappaththige, Diluka Loku, and Gayan Amarasuriya. "NOMA-aided cell-free massive MIMO with underlay spectrum-sharing." In ICC 2020-2020 IEEE International Conference on Communications (ICC), pp. 1-6. IEEE, 2020.

Panda, Satyasen. "Performance optimization of cell-free massive MIMO system with power control approach." AEU-International Journal of Electronics and Communications 97 (2018): 210-219.

* cited by examiner

SYSTEM AND METHOD FOR PROVIDING DISTRIBUTED COMMUNICATION

CROSS-REFERENCE TO RELATED APPLICATIONS

The present application is a non-provisional patent application claiming priority to European Patent Application No. 20205583.6, filed Nov. 4, 2020, the contents of which are hereby incorporated by reference.

FIELD OF THE DISCLOSURE

The disclosure relates to a system for providing distributed communication with respect to at least one user equipment and a method for providing distributed communication with respect to at least one user equipment.

BACKGROUND

Generally, in times of an increasing number of communication applications providing wireless connectivity capabilities, there is a growing need of a system for providing distributed communication with respect to at least one user equipment and a method for providing distributed communication with respect to at least one user equipment in order to ensure a particularly efficient and reliable communication with respect to such applications.

US 2019/0238213 A1 relates to a method and an apparatus for cooperative wireless communications. In this context, a wireless transmit/receive unit (WTRU) is provided. The WTRU comprises a transceiver; and a processor operatively coupled to the transceiver, wherein the transceiver and the processor are configured to establish a connection with a first wireless network node and a second wireless network node. The transceiver and the processor are further configured to receive power configurations and timing advances from the first wireless network node independently of the second wireless network node. In addition to this, the transceiver and the processor are further configured to simultaneously receive downlink signals front both the first wireless network node and the second wireless network node, the downlink signals being independently scheduled by a scheduler of the first wireless network node and a scheduler of the second wireless network node. Unfortunately, with respect to the cooperative wireless communication, the respective elements for making the communication cooperative are not centrally managed in the context of a common connection, which leads to an inefficient and unreliable communication.

SUMMARY

Accordingly, the disclosure includes a system for providing distributed communication with respect to at least one user equipment and a method for providing distributed communication with respect to at least one user equipment, potentially providing a high efficiency and reliability of the distributed communication.

According to a first aspect of the disclosure, a system for providing distributed communication with respect to at least one user equipment is provided. The system comprises multiple communication units for distributing the communication with respect to the at least one user equipment, at least one communication management unit connected to at least a part of the multiple communication units in a connection line for managing the distributed communication, at least one connection unit comprising loss-inserting properties for connecting at least one of the part of the multiple communication units to the connection line, at least one amplifying unit for being arranged with respect to at least one of the at least one connection unit, and a scheduling unit. In this context, the scheduling unit is configured to determine power loss with respect to the connection line and/or with respect to at least one of the at least one connection unit on the basis of the corresponding loss-inserting properties and/or to schedule at least one of at least the part of the multiple communication units and/or at least one of the at least one amplifying unit in order to compensate for power loss with respect to at least one of the at least one connection unit.

Scheduling the at least one of at least the part of the multiple communication units may comprise acting on the corresponding at least one connection unit, for example on the circuitry thereof, in order to tap the respective signal towards the corresponding at least one of at least the part of the multiple communication units.

In the case that a communication unit is scheduled, its corresponding connection unit may be set with a certain split ratio.

It is noted that the power loss to be compensated may depend on the respective tapping loss on top of any connection line attenuation.

It is further noted that whereas, as already mentioned above, a connection unit may comprise a certain split ratio for example being configurable, an amplifying unit may comprise a certain gain for example being configurable in order to compensate for the respective power loss due to power tapping and/or connection line insertion loss.

The at least one communication management unit may be configured to perform processing with respect to the corresponding data path and/or the corresponding control path.

According to a first implementation form of the first aspect of the disclosure, the multiple communication units comprise or are multiple access points. In addition to this or as an alternative, the at least one connection unit comprises or is at least one splitter. Additionally or alternatively, the connection line is based on a wired connection. Further additionally or further alternatively, the distributed communication is based on a wireless communication. Complexity can be reduced, which leads to an increased efficiency.

According to a second implementation form of the first aspect of the disclosure, the connection line comprises or is a fronthaul link. In addition to this or as an alternative, the distributed communication is based on at least one of time division multiple access (TDMA), frequency division multiple access (FDMA), or any combination thereof. Further additionally or further alternatively, the system comprises at least one additional scheduling unit being configured to at least partially distribute the respective scheduling of the scheduling unit. For example, if the distributed communication is based on time division duplexing (TDD), TDD may allow for providing feedback on the radio channel quality indicator from the multiple communication units for the scheduling unit in a particularly efficient manner.

In the case that TDMA is used, each or a subset of at least the part of multiple communication units may share the same respective resource block(s) such as TDMA and/or FDMA. For the other communication units being not concerned by the resource block(s), they might not tap power, hence limited if no power loss due to split ratio. Furthermore, the corresponding amplifying unit might only compensate for, for example, the respective channel loss.

With respect to the at least partially distributed scheduling, in the case that a communication unit is scheduled for communication and/or not by the scheduling unit, the amount of split ratio and/or gain may be decided locally on the basis of, for instance, the respective receive signal strength.

In some examples, the respective communication unit comprises a corresponding additional scheduling unit for the local decision.

According to a further implementation form of the first aspect of the disclosure, the scheduling unit is configured to schedule the at least one of at least the part of the multiple communication units and/or at least one of the at least one connection unit and/or the at least one of the at least one amplifying unit on the basis of at least one of topology, for example access topology, of the distributed communication, architecture of the connection line, bandwidth of the connection line, channel quality indication with respect to the distributed communication, channel quality indication with respect to the connection line, position of at least one of the at least one user equipment, traffic requirements of a user, quality of service requirements, or any combination thereof.

According to a further implementation form of the first aspect of the disclosure, the scheduling unit is configured to schedule the at least one of at least the pan of the multiple communication units and/or at least one of the at least one connection unit and/or the at least one of the at least one amplifying unit on the basis of feedback information from at least one of at least the pan of the multiple communication units.

According to a further implementation form of the first aspect of the disclosure, the feedback information comprises a channel quality indicator, for example a radio channel quality indicator, with respect to the distributed communication and/or a channel quality indicator with respect to the connection line.

According to a further implementation form of the first aspect of the disclosure, the scheduling unit is configured to broadcast a control message indicating which of the at least one amplifying unit is/are to be activated and/or the corresponding level of amplification. Unneeded resources can be switched off, which can save power and increase efficiency.

The control message may additionally or alternatively indicate which of at least the pan of multiple communication units is/are to be activated.

In addition to this or as an alternative, the control message indicates which of the least one connection unit is/are to be activated and/or the corresponding split ratio.

According to a further implementation form of the first aspect of the disclosure, at least one of the at least one connection unit comprises at least two operating modes. In this context, the at least two operating modes comprise a splitting mode, for example a loss-inserting splitting mode, wherein the respective signal is split in order to be provided for the corresponding communication unit and to be forwarded on the connection line, and a bypass mode, for example a loss-free or nearly loss free bypass mode, wherein the respective signal is forwarded on the connection line.

With respect to the bypass mode, it is noted that the respective signal may generally be amplified due to impairments such as channel attenuation turd/or power loss in the corresponding junction.

According to a further implementation form of the first aspect of the disclosure, the control message indicates which of at least the part of the multiple communication units is/are to be activated and/or which of the at least two operating modes is to be used with respect to the corresponding at least one of the at least one connection unit.

According to a further implementation form of the first aspect of the disclosure, at least one of the at least one amplifying unit is assigned to at least one configuration profile with the aid of the scheduling unit. For instance, such a configuration profile may indicate a corresponding operating mode with respect to at least one of the at least one connection unit and/or at least one oldie multiple communication units.

According to a further implementation form of the first aspect of the disclosure, the scheduling unit is configured to schedule at least one of the multiple communication unit and/or at least one of the at least one at amplifying unit to be permanently active.

According to a further implementation form of the first aspect of the disclosure, the system comprises at least one combined communication unit comprising at least one of the at least one amplifying unit, the corresponding connection unit, and the corresponding communication unit. In this context, at least one of the at least one combined communication unit is for example based on electrical and optical components being integrated into a single or modular chip.

With respect to the corresponding powering of the respective connection unit and/or amplifying unit, a power wire may be added from the corresponding communication unit to the connection unit and/or amplifying unit.

The system may comprise a dedicated power wire configured to feed all connection units, amplifying units, and communication units.

According to a second aspect of the disclosure, a method for providing distributed communication with respect to at least one user equipment is provided. The method comprises the steps of distributing the communication with respect to the at least one user equipment with the aid of multiple communication units, managing the distributed communication with the aid of at least one communication management unit connected to at least a part of the multiple communication units in a connection line, connecting at least one of the part of the multiple communication units to the connection line with the aid of at least one connection unit comprising loss-inserting properties, arranging at least one amplifying unit with respect to at least one of the at least one connection unit, and determining power loss with respect to the connection line and/or with respect to at least one of the at least one connection unit on the basis of the corresponding loss-inserting properties with the aid of a scheduling unit and/or scheduling at least one of at least the part of the multiple communication units and/or at least one of the at least one amplifying unit with the aid of the scheduling unit in order to compensate for power loss with respect to at least one of the at least one connection unit.

According to a first implementation form of the second aspect of the disclosure, the method comprises the step of scheduling the at least one of at least the part of the multiple communication units and/or at least one of the at least one connection unit and/or the at least one of the at least one amplifying unit on the basis of at least one of topology, for example access topology, of the distributed communication, architecture of the connection line, bandwidth of the connection line, channel quality indication with respect to the distributed communication, channel quality indication with respect to the connection line, position of at least one of the at least one user equipment, traffic requirements of a user, quality of service requirements, or any combination thereof.

According to a second implementation form of the second aspect of the disclosure, the method comprises the step of scheduling the at least one of at least the part of the multiple communication units and/or at least one of the at least one connection unit and/or the at least one of the at least one amplifying unit on the basis of feedback information from at least one of at least the part of the multiple communication units.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied ire many different forms and should not be construed as limited to the embodiments set forth herein; rather, these embodiments are provided by way of example. Furthermore, like numbers refer to the same or similar elements or components throughout.

Figure 1:
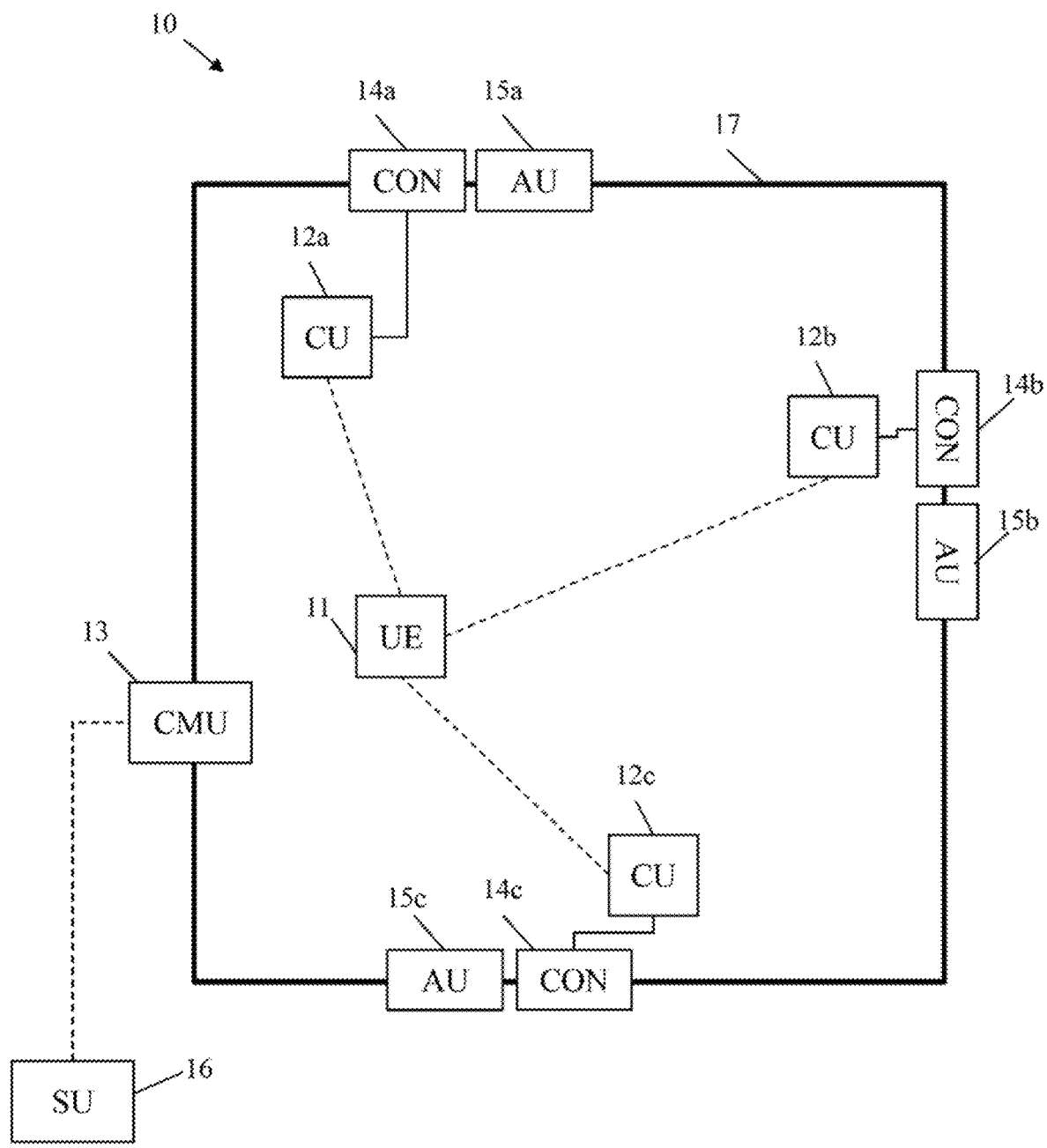
FIG. 1 shows a system, according to an example.

With respect to FIG. 1, a block diagram of an embodiment of a system 10 for providing distributed communication with respect to at least one user equipment 11 is shown.

According to FIG. 1, the system 10 comprises multiple communication units 12a, 12b, 12c for distributing the communication with respect to the user equipment 11, a communication management unit 13 connected to the multiple communication units 12a, 12b, 12c in a connection line 17 lot managing the distributed communication.

As it can further be seen, the system 10 additionally comprises three connection units 14a, 14b, 14c, each of which comprises loss-inserting properties, for connecting each of the multiple communication units 12a, 12b, 12c to the connection line 17. Furthermore, the system 10 comprises three amplifying units 15a, 15b, 15c for being arranged with respect to each of the three connection units 14a, 14b, 14c.

Moreover, the system 10 further comprises a scheduling unit 16 being configured to determine power loss with respect to the three connection units 14a, 14b, 14c on the basis of the corresponding loss-inserting properties and or to schedule the multiple communication units 12a, 12b, 12c and/or the three amplifying units 15a, 15b, 15c in order to compensate for power loss with respect to the three connection units 14a, 14b, 14c.

It is noted that it may also be compensated for the respective power loss of the connection line 17. In this context, it is further noted that, for instance, from one communication unit to the next, the connection line 17 may introduce attenuation.

With respect to the multiple communication units 12a, 12b, 12c, it is noted that the multiple communication units 12a, 12b, 12c may for example comprise or be multiple access points. With respect to the three connection units 14a, 14b, 14c, it is noted that such a connection unit may comprise or be, at least one splitter.

With respect to the above-mentioned connection line 17, the connection line 17 can be based on a wired connection. Additionally or alternatively, the connection line 17 may for example comprise or be a front haul link. In addition to this or as an alternative, with respect to the distributed communication, it is noted that the distributed communication a may be based on a wireless communication. Further additionally or further alternatively, the distributed communication may for example be based on time division duplexing.

It is further noted that the scheduling unit 16 can be configured to schedule the multiple communication units 12a, 12b, 12c and/or the three amplifying units 15a, 15b, 15c on the basis of at least one of topology, for example access topology, of the distributed communication, architecture of the connection line 17, bandwidth of the connection line 17, channel quality indication with respect to the distributed communication, channel quality indication with respect to the connection line 17, position the user equipment 11, traffic requirements of a user, quality of service requirements, or any combination thereof.

In addition to this or as an alternative, the scheduling unit 16 may be configured to schedule the multiple communication units 12a, 12b, 12c and/or the three amplifying units 15a, 15b, 15c on the basis of feedback information from the multiple communication units 12a, 12b, 12c. For example, the feedback information comprises a channel quality indicator, for example a radio channel quality indicator, with respect to the distributed communication and/or a channel quality indicator with respect to the connection line 17.

For example the scheduling unit 16 is configured to broadcast a control message indicating which of the three amplifying units 15a, 15b, 15c is/are to be activated and/or the corresponding level of amplification. Furthermore, at least one of the three connection units 14a, 14b, 14c can include at least two operating modes.

In this context, the at least two operating modes may comprise a splitting mode, for example a loss-inserting splitting mode, wherein the respective signal is split in order to be provided for the corresponding communication unit and to be forwarded on the connection line 17, and a bypass mode, for example a loss-free or nearly loss-free bypass mode, wherein the respective signal is forwarded on the connection line 17.

For example, the control message indicates which of the multiple communication units 12a, 12b, 12c is/are to be activated and/or which of the at least two operating modes is to be used with respect to the corresponding at least one of the three connection units 14a, 14b, 14c.

For example, the three amplifying units 15a, 15b, 15c are assigned to at least one configuration profile with the aid of the scheduling unit 16. For example, the scheduling unit 16 is configured to assign the three amplifying units 15a, 15b, 15c, to at least one configuration profile.

In addition to this or as an alternative, the scheduling unit 16 may be configured to schedule the multiple communication units 12a, 12b, 12c and/or the three amplifying units 15a, 15b, 15c to be permanently active.

Furthermore, it is noted that the system 10 may additionally or alternatively comprise at least one combined communication unit comprising at least one of the three amplifying units 15a, 15b, 15c, the corresponding connection unit 14a, 14b, 14c, and the corresponding communication unit 12a, 12b, 12c. For example, at least one of the at least one combined communication unit is based on electrical and optical components being for example integrated into a single chip.

Figure 2:
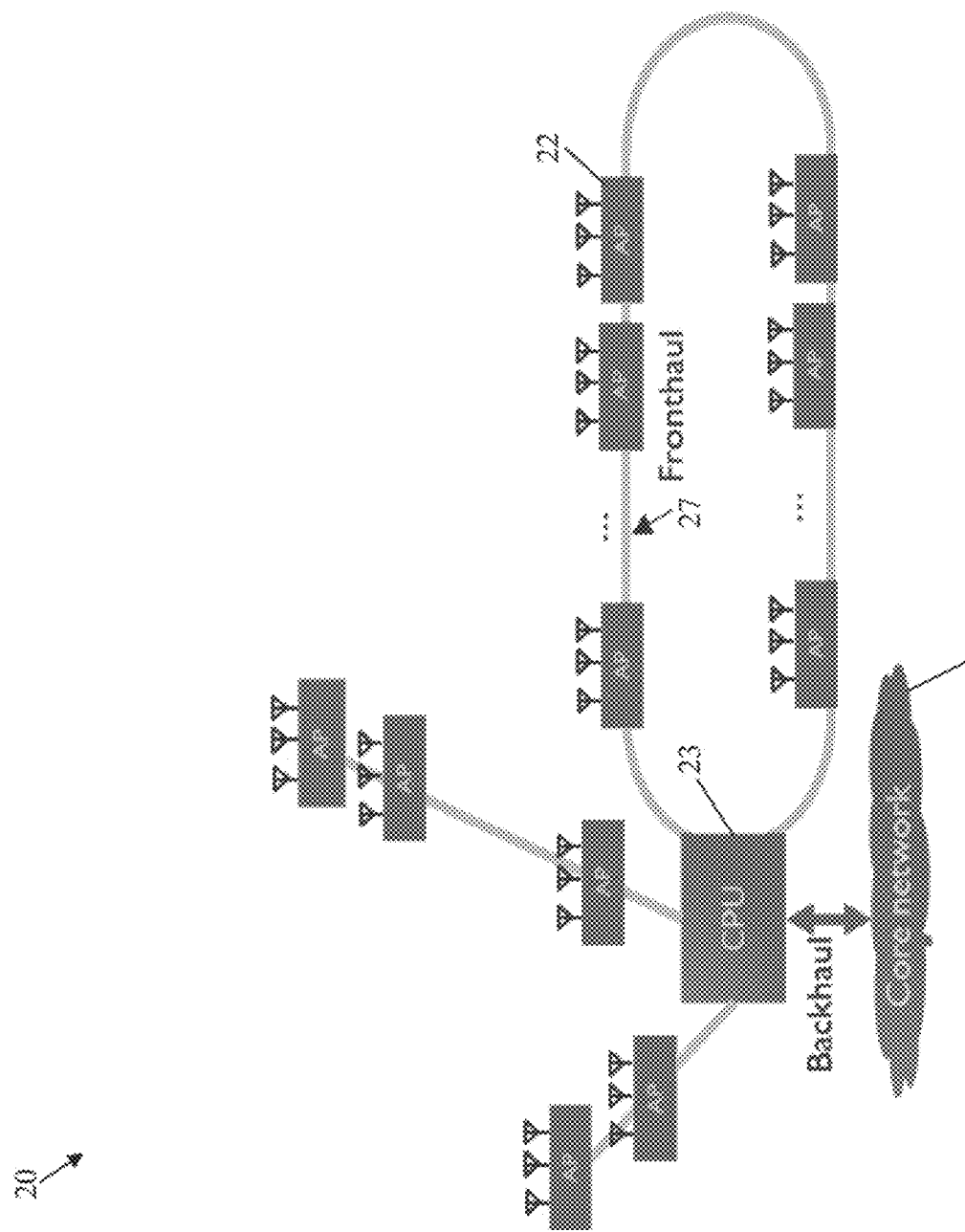
FIG. 2 shows a cell free massive MIMO system, according to an example.

Now, with respect to FIG. 2, a further embodiment of the first aspect of the disclosure in the form of a cell free massive MIMO system 20 is illustrated.

A cell free (CF) massive MIMO system 20, as depicted in FIG. 2, is a massive multiple-input multiple-output (MIMO), dense distributed topology with a user centric design. The CF terminology comes from the fact that all or a subset of access points (APs) cooperate to serve the users in a user-centric fashion hence additional macro-diversity and possibly no inter-cell-interference.

With respect to cell free massive MIMO, it is noted that cable strips, for example radio strips or radio cable strips, may be employed. Such a strip may, for example, comprise multiple antennas and corresponding processing units.

As it can be seen from FIG. 2, the system 20 comprises access points (APs), for example non-collocated access points, wherein one of the AP is representatively equipped with reference sign 22. It is noted that each of the APs may be equivalent to or a kind of communication unit such as one of the communication units 12a, 12b, 12c according to FIG. 1. Furthermore, the system 20 comprises one more central processing units (CPUs) 23. The CPU 23 may be equivalent to or a kind of the communication management unit 13 of FIG. 1.

As it can further be seen from FIG. 2, in accordance with the system 20, the APs and CPU(s) are connected through some high-speed fronthaul (FH) wires such as (glass) fiber, twisted pairs, coax, plastic (optical fiber), to carry at least one of data, power, clock information, or any combination thereof. In this context, a part of the FH wires is representatively equipped with reference sign 27. It is noted that the FH may be equivalent to or a kind of the connection line 17 according to FIG. 1. Furthermore, the CPU 23 may for example be connected to a core network 28 via a backhaul.

Figure 3:
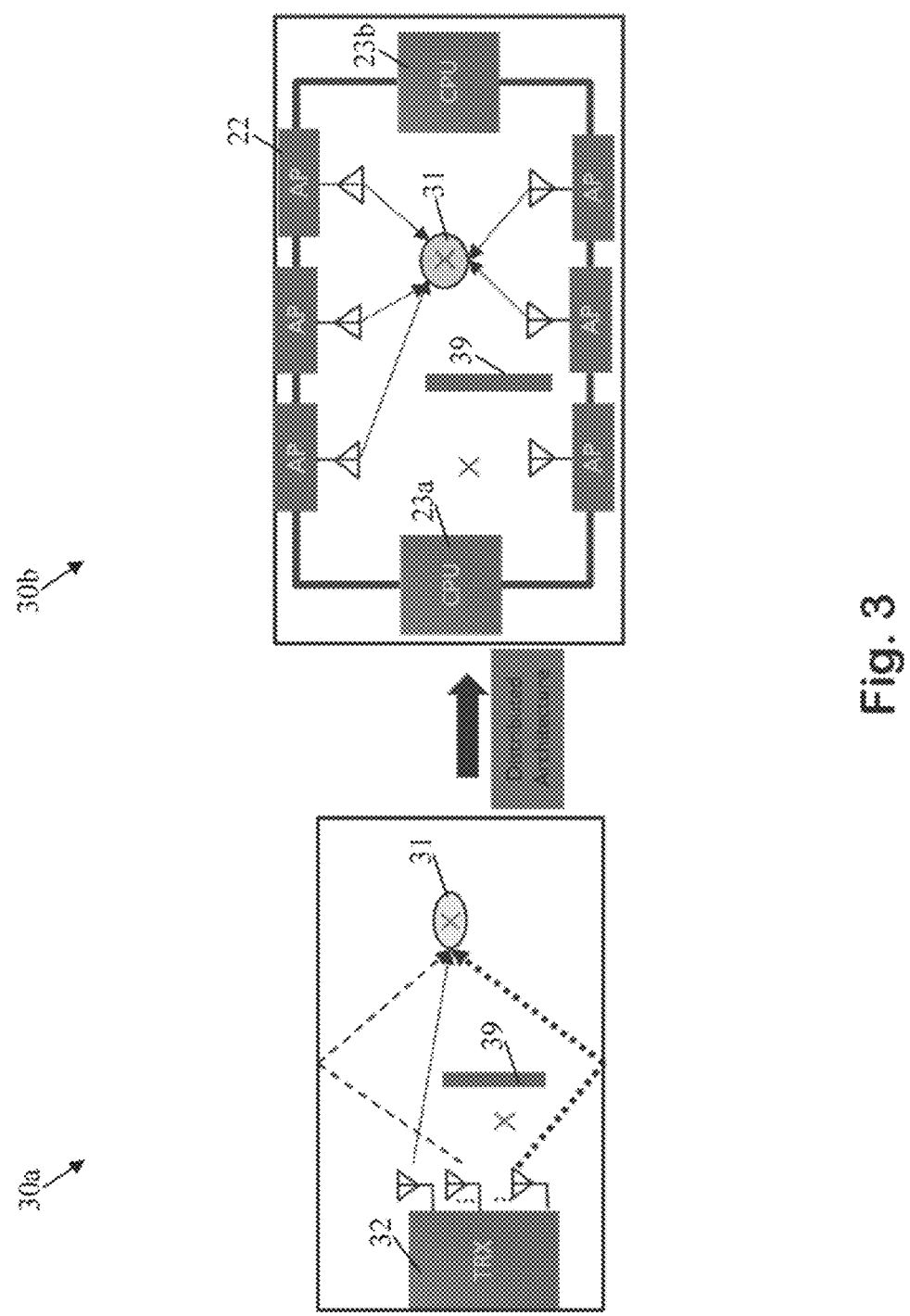
FIG. 3 illustrates a distributed architecture and a centralized architecture, according to an example.

Now, with respect to FIG. 3, the distributed architecture 30b in the sense of the disclosure versus a centralized architecture 30a is illustrated by FIG. 3. In accordance with the centralized architecture 30a, due to an obstacle 39, only one antenna of the multiple antennas of the transceiver 32 has a direct sight connection to the user equipment 31. Accordingly, the respective communication will suffer from the obstacle 39.

In contrast thereto, according to the distributed architecture 30b, only antennas and their corresponding access points with direct sight connection with respect to the user equipment are used for communication. Accordingly, the respective communication will not suffer from the obstacle 39.

Owing to of the excessive number of APs as shown in FIG. 2 or the right side of FIG. 3, and the corresponding complexity limitation being exemplarily based on latency or the respective fronthaul bandwidth, it might be useful to select only a subset of APs to serve a subset of users for data connectivity i.e. mapping users to APs and simultaneously to control the transmit power of the active users.

Figure 4:
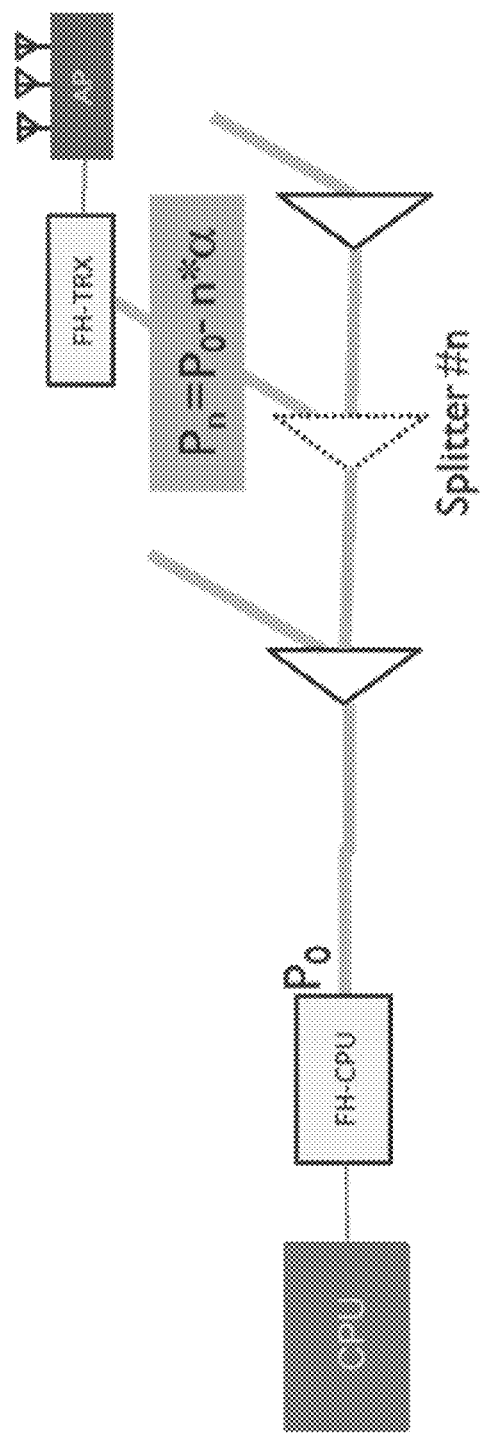
FIG. 4 shows power loss in a P2MP architecture, according to an example.

However, the total number of used or scheduled APs can be still very high, hence when the fronthauled (FH) downlink signal (DL) in a point to multipoint (P2MP) architecture, is "travelling" from the source (CPU) to the different destinations (APs), it will go, for instance, through multiple stages of splitters such as the connection units 14a, 14b, 14c of FIG. 1. Hence, the signal will incur a power loss of, for example, 3 dB after each splitter as illustrated in FIG. 4. This results an undesirable effect called the "near-far problem," wherein the closest APs will experience less power loss than the farthest APs experiencing a severally attenuated signal.

Assume for simplicity one P2MP fronthaul link connecting the CPU and 'L' APs (see FIG. 4), an ideal FH link with no power loss where each splitter adds α dB signal loss (α denotes the split ratio). With $P_0$ transmit signal power in DL, at the n-th splitter, the power received by the n-th AP can be expressed as $P_n = P_0 - n \cdot \alpha$. Hence, the performance decreases as 'n' increases. For instance, at the APL=100, there will be 300 dB loss when α=300 dB which is generally not acceptable and makes the FH transport network not transparent to the end-to-end wireless link.

As a consequence of this, all (or a subset of) splitters are connected to amplify and forward devices (AFDs) such as the amplifying units 15a, 15b, 15c according to FIG. 1 to partially compensate for the power loss. The amount of power split ratio (α) and/or the power compensation (β) of (subset of) AFDs is determined by a scheduler such as the scheduling unit 16 of FIG. 1. The scheduler, based on, for instance, radio access topology, FR link architecture and/or bandwidth, channel quality indication, position of user equipments, user's traffic requirements, quality of service (QoS) requirements etc., schedules the APs and/or the AFDs and/or the amount of power loss compensation. The power loss compensation can be jointly optimized with APs scheduling and the power allocation.

Optionally, the AFD architecture, can comprise permanent AFDs that are active all the time. For instance, if some APs are labeled as second-order master APs that are permanently scheduled to ensure some minimum performance, then the corresponding AFDs can also be continuously active. These AFDs may for example only embed simple circuitry and no functionality such as decoding some control messages.

Figure 5:
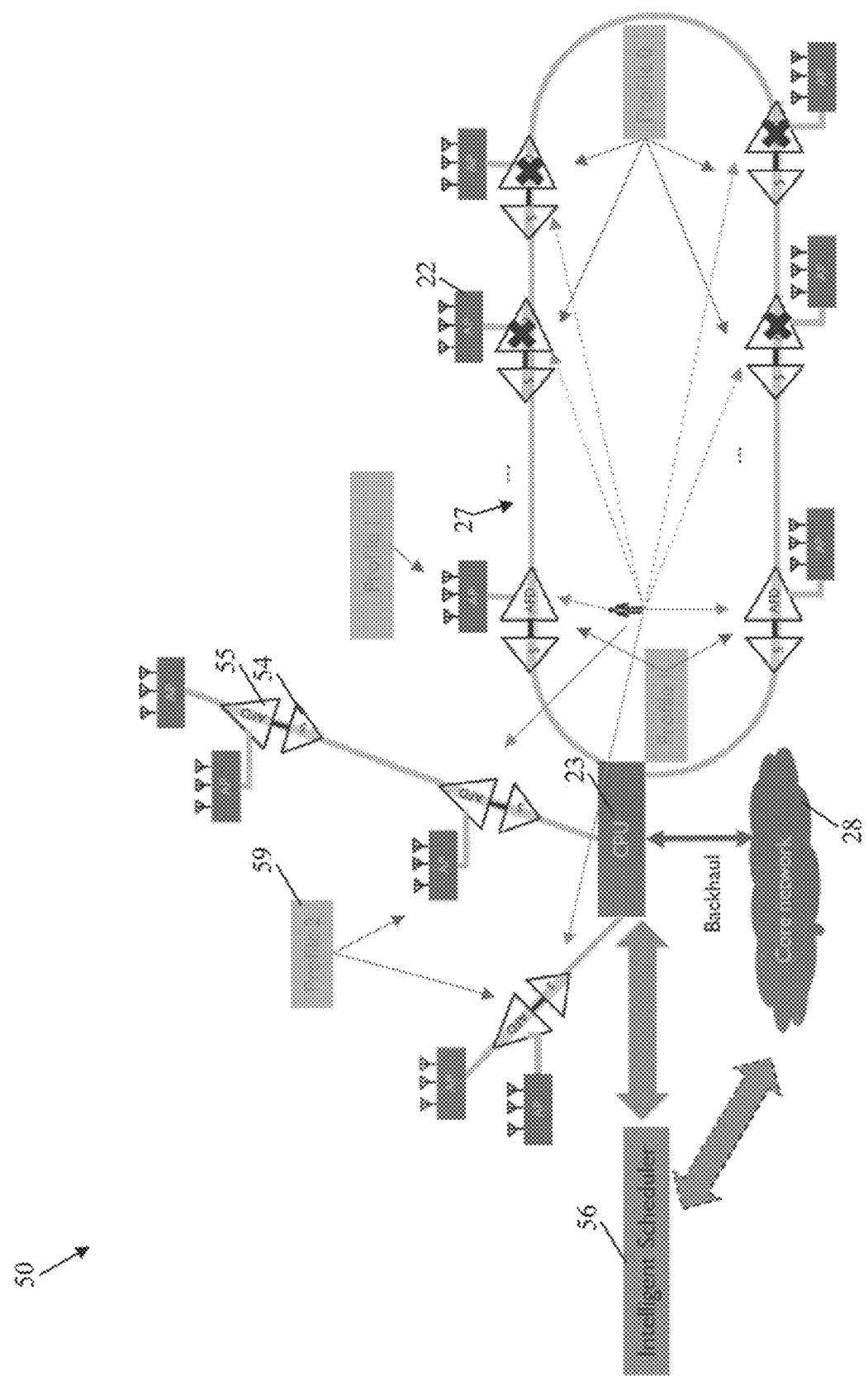
FIG. 5 shows a centralized scheduler and AFD scheduling, according to an example.

As already mentioned above in the context of the scheduling unit 16 according to FIG. 1, the scheduler may comprise several operating modes:

The scheduler will determine which subset of AFD should be active and/or the amount of signal amplification. In a first fully centralized architecture 50 as depicted in FIG. 5, the scheduler 56 may need some feedback from APs on the radio channel quality indicator (CQI) (which may be available thanks to TDD frame structure) combined with historical topology data to take its decision.

For the sake of completeness, it is noted that one of the AFDs is representatively equipped with reference sign 55. The AFDs may be equivalent to or a kind of the amplifying units 15a, 15b, 15c of FIG. 1. By analogy therewith, one of the splitters (S) is representatively equipped with reference sign 54. The splitters may be equivalent to or a kind of the connection units 14a, 14b, 14c according to FIG. 1. Furthermore, the architecture 50 may comprise at least one of the above-mentioned CPU 23, which may communicate with the core network 28 for example via a backhaul. It is further noted that the scheduler 56 may communicate with the CPU 23 and/or the core network 28.

Again, with respect to the scheduler 56 or the operating modes thereof, respectively, if, for instance, the AP has very good radio CQI, then the DL signal towards this AP can be less amplified (iso lower split ratio), otherwise if the AP has a very bad radio CQI, then either this AP won't be scheduled, or a high signal amplification (higher split ratio) is needed or applied, respectively.

The radio CQI and FH CQI can be farther combined to determine the operating mode of the AP and the associated AFD. The scheduler 56 can then broadcast a control channel indicating which AFD should be active and their level of amplification. The control message can also indicate the AP activity (e.g. scheduled or not) and/or the respective splitter operating mode. In a further embodiment, the scheduler 56 could also advocate network slicing in which the AFDs are assigned to configuration profiles as also depicted in FIG. 5. It is noted that one of the profiles is representatively equipped with reference sign 59.

Figure 6:
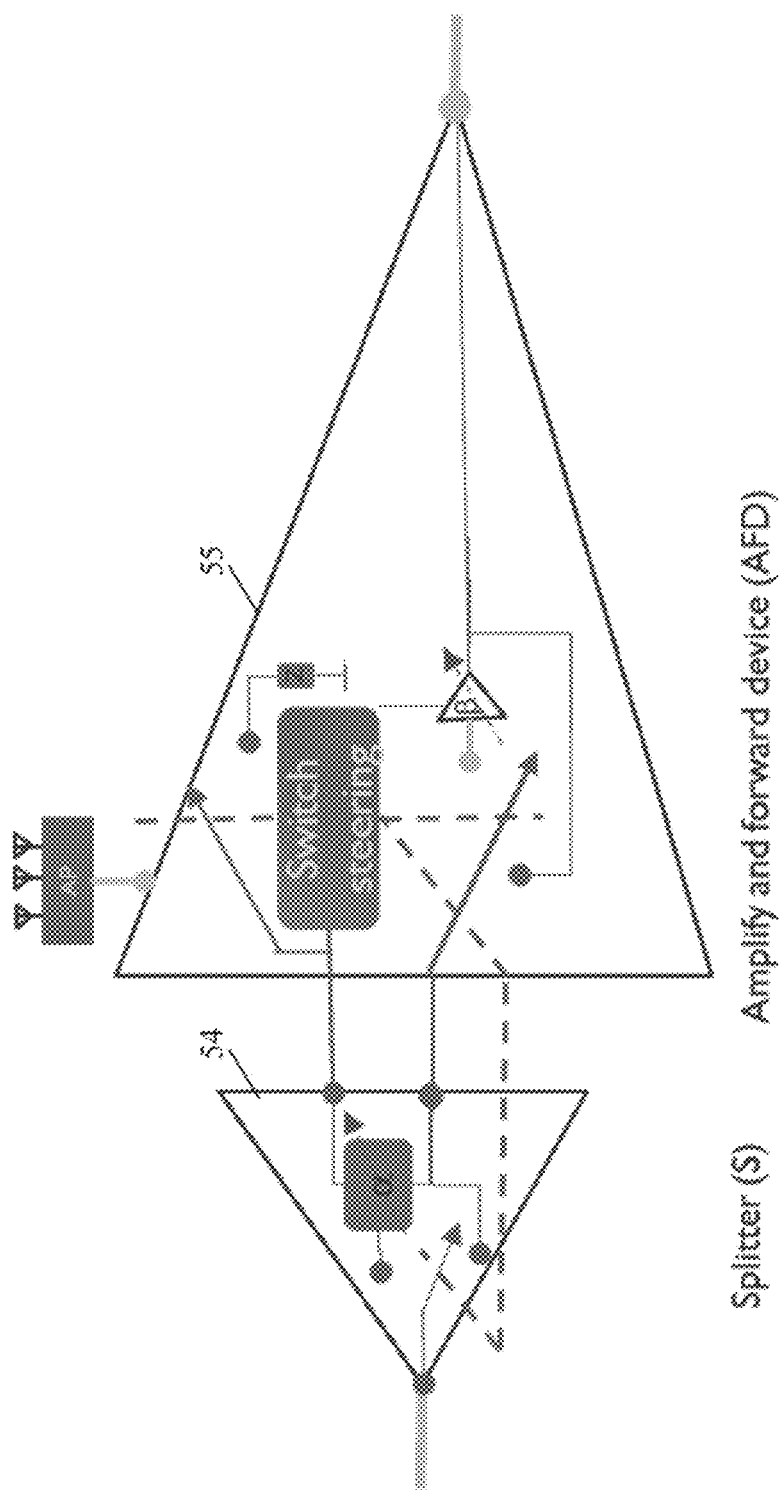
FIG. 6 shows an AFD and its associated splitter, according to an example.
Figure 7:
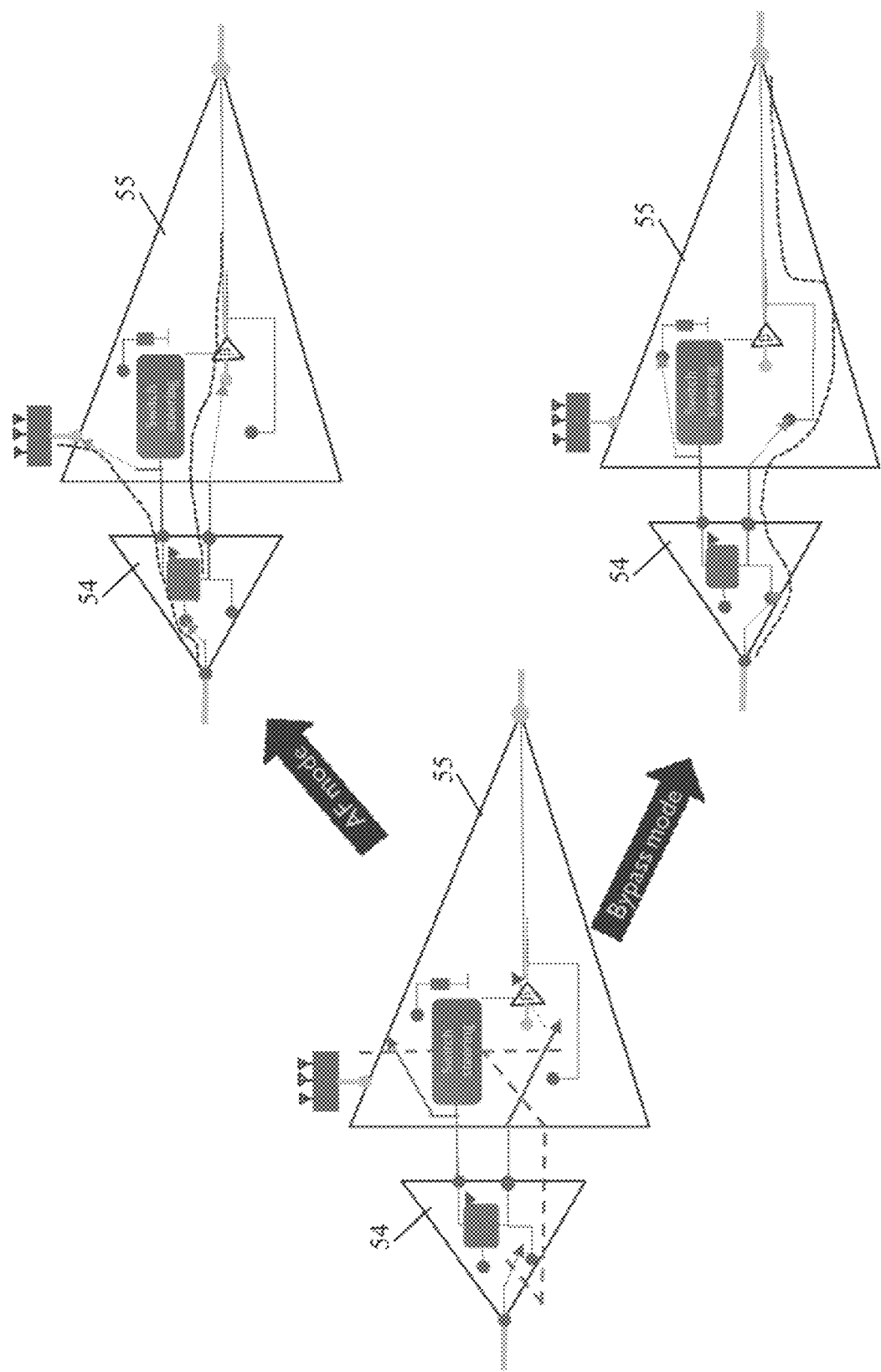
FIG. 7 shows operating modes of the AFD and its associated splitter according to FIG. 6, according to an example.

The profiles can also indicate operating modes of the APs and/or splitters. The profiles may be communicated on regular basis. Each AFD, after decoding the AF control messaging, switches together with its connected splitter (see FIG. 6) to the desired operating mode associated with the desired profile:

If AFD is scheduled as well as the corresponding AP, then a set of switches are configured to setup the AF mode link for the AFD and AP active mode allowing a fraction of the data signal to reach the AP as indicated in the top of FIG. 7. The mode may be part of or similar to the above-mentioned splitting mode.

Otherwise, if AFD is instructed to be shut down and its associated AP is not scheduled, then the switches commute to AF bypass mode and AP bypass mode as indicated in the bottom of FIG. 7, in which case, the splitters are also in bypass mode without incurring any/limited power loss by the proper load termination instead of AP. The load can be designed such that no or marginal power loss occurs. Alternatively, the splitter can contain switches that in this mode of operation disable the AP path. The foregoing mode may be part of or similar to the above-mentioned bypass mode.

In a second partially centralized architecture, the AFD scheduling can also be partially distributed. For instance, the AP associated with the AFD can set the operating mode of the latter based on a local decision or some control information it received from the centralized scheduler.

This can be the case even if the AP scheduling is partially distributed. In this case the switch steering can be part of the AP in which case the AP can make a local decision or receive instructions from the scheduler about its activity mode:

If AP active mode then AFD is configured to the AF mode;
If AP bypass mode then AFD is configured to the AF bypass mode.

If the AP receives instructions from the centralized scheduler, then it is generally able to regularly listen and decode the control messages to set its mode of activity and/or configure the respective AFD and/or splitter.

In a further embodiment, in order to reduce the hardware complexity, an integrated solution or an integrated chip can be realized, respectively, wherein a single chip comprises the AP, splitter and AFD (for example, a mix of electronics and optical signals) as already mentioned in the context of FIG. 1.

Alternatively, in the case of a limited number of AFDs (smaller than the number of APs), then the best places on where to place these devices can be done once during the network design phase.

Generally, it is noted that the disclosure makes the fronthaul link transparent to the end-to-end radio network and further allows power saving. With respect to the scheduler 56 or the scheduling unit 16, respectively, an intelligent scheduling may be employed. Such an intelligent scheduling can use, for instance, machine learning techniques to learn the behavior of the respective network to take the right decisions.

Figure 8:
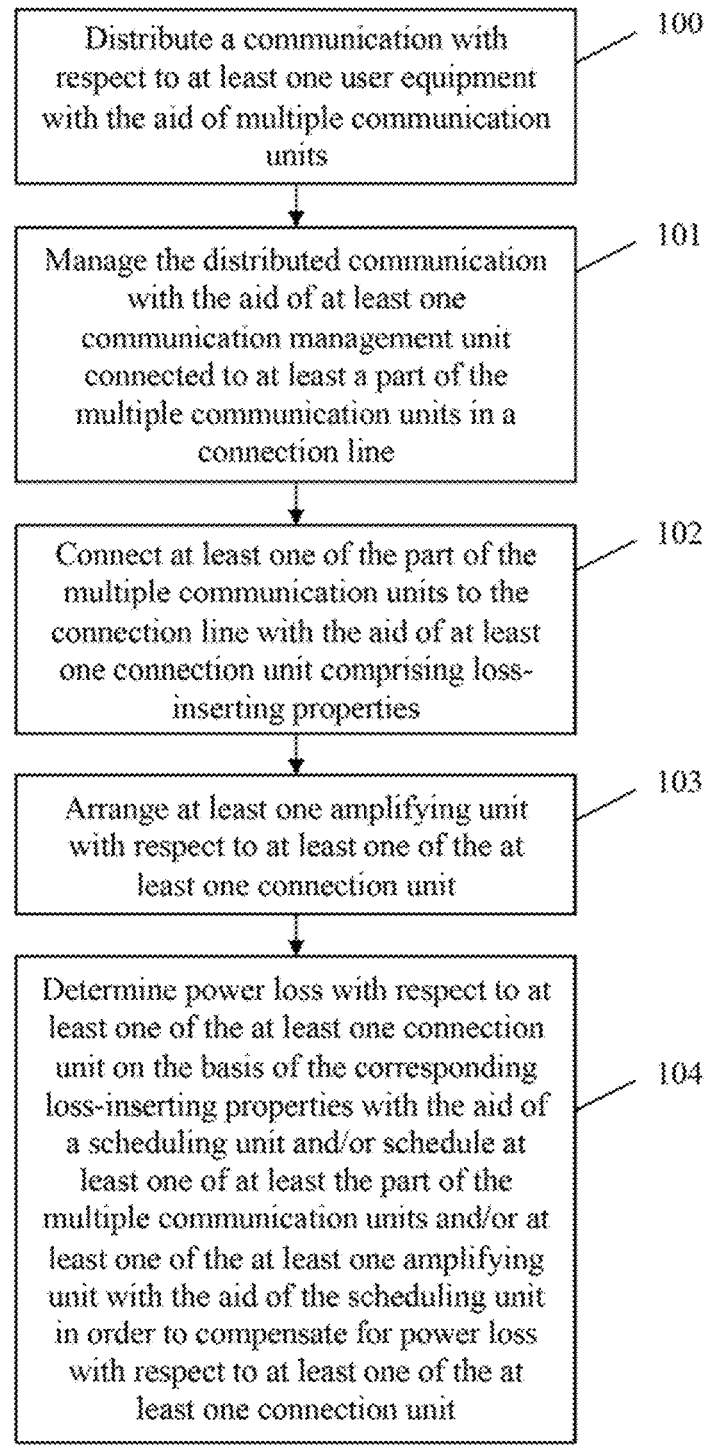
FIG. 8 is a flow chart of a method, according to an example.

Finally, FIG. 8 shows a flow chart of a method for providing distributed communication with respect to at least one user equipment. In a first step 100, the communication is distributed with respect to the at least one user equipment with the aid of multiple communication units. Then, in a second step 101, the distributed communication is managed with the aid of at least one communication management unit connected to at least a part of the multiple communication units in a connection line. Furthermore, in a third step 102, at least one of the part of the multiple communication units is connected to the connection line with the aid of at least one connection unit comprising loss-inserting properties. Moreover, in a fourth step 103, at least one amplifying unit is arranged with respect to at least one of the at least one connection unit. Then, in a fifth step 104, power loss is determined with respect to at least one of the at least one connection unit on the basis of the corresponding loss-inserting properties with the aid of a scheduling unit and/or at least one of at least the part of the multiple communication units and/or at least one of the at least one amplifying unit is scheduled with the aid of the scheduling unit in order to compensate for power loss with respect to at least one of the at least one connection unit.

The method may also comprise the step of scheduling the at least one of at least the part of the multiple communication units and/or the at least one of the at least one amplifying unit on the basis of at least one of topology, for example access topology, of the distributed communication, architecture of the connection line, bandwidth of the connection line, channel quality indication with respect to the distributed communication, channel quality indication with respect to the connection line, position of at least one of the least one user equipment, traffic requirements of a user, quality of service requirements, or any combination thereof.

In addition to this or as an alternative, the method may comprise the step of scheduling the at least one of at least the pan of the multiple communication units and/or the at least one of the at least one amplifying unit on the basis of feedback information from at least one of at least the part of the multiple communication units.

With respect to the multiple communication units, it is noted that the multiple communication units may comprise or be multiple access points. In addition to this or as an alternative, with respect to the at least one connection unit, the at least one connection unit may comprise or be at least one splitter.

Additionally or alternatively, with respect to the connection line, the connection line may be based on a wired connection. Furthermore, the connection line may comprise or be a fronthaul link. Further additionally or further alternatively, the distributed communication may be based on a wireless communication. Moreover, the distributed communication may be based on time division duplexing.

The feedback information may comprise a channel quality indicator, for example a radio channel quality indicator, with respect to the distributed communication and/or a channel quality indicator with respect to the connection line. In addition to this or as an alternative, the method may comprise the step of broadcasting a control message indicating which of the at least one amplifying unit is/are to be activated and/or the corresponding level of amplification with the aid of the scheduling unit.

With respect to the at least one connection unit, it is noted that at least one of the at least one connection unit may comprise at least two operating modes. The at least two operating modes may comprise a splitting mode, for example a loss-inserting splitting mode, wherein the respective signal is split in order to be provided for the corresponding communication unit and to be forwarded on the connection line, and a bypass mode, for example a loss-free or nearly loss-free bypass mode, wherein the respective signal is forwarded on the connection line.

The control message can indicate which of at least the part of the multiple communication units is/are to be activated, and/or which of the at least two operating modes is to be used with respect to the corresponding at least one of the at least one connection unit. Furthermore, the method may comprise the step of assigning at least one of the at least one amplifying unit to at least one configuration profile with the aid of the scheduling unit.

In addition to this or as an alternative, the method may comprise the step of scheduling at least one of the multiple communication unit and/or at least one of the at least one amplifying unit to be permanently active with the aid of the scheduling unit. Further additionally or further alternatively, the method may comprise the step of integrating at least one of the at least one amplifying unit, the corresponding connection unit, and the corresponding communication unit into at least one combined communication unit. At least one of the at least one combined communication unit can be based on electrical and optical components being for example integrated into a single chip.

While various embodiments of the present disclosure have been described above, it should be understood that they have been presented by way of example only, and not limitation. Numerous changes to the disclosed embodiments can be made in accordance with the disclosure herein without deputing from the spirit or scope of the disclosure. Thus, the breadth and scope of the present disclosure should not be limited by any of the above described embodiments.

Although the disclosure has been illustrated and described with respect to one or more implementations, equivalent alterations and modifications will occur to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and for any given or particular application.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A system comprising:
    communication units configured for distributing a communication signal for a user equipment,
    a communication management unit connected to the communication units via a connection line,
    connection units each exhibiting loss-inserting properties, wherein the connection units respectively connect the communication units to the connection line,
    amplifying units connected respectively to the connection units, and
    a scheduling unit configured to:
    determine power loss corresponding to the connection units based on the loss-inserting properties, and
    broadcast a control message indicating which of the communication units, which of the connection units, and which of the amplifying units are to be activated, based on the power loss, wherein the control message further indicates whether each connection unit is to:
        operate in a splitting mode in which the connection unit splits the communication signal between the communication unit corresponding to the connection unit and the connection line; or
        operate in a bypass mode in which the connection unit is not connected to the communication unit and the communication signal upstream of the connection unit is provided to the connection line downstream of the communication unit.

2. The system according to claim 1, wherein the communication units comprise access points.

3. The system according to claim 1, wherein the connection units comprise splitters.

4. The system according to claim 1, wherein the connection line comprises a wired connection.

5. The system according to claim 1, wherein the communication signal is based on a wireless communication.

6. The system according to claim 1, wherein the connection line comprises a fronthaul link.

7. The system according to claim 1, wherein the communication signal is based on time division multiple access or frequency division multiple access.

8. The system according to claim 1, wherein the scheduling unit is configured to broadcast the control message based on a topology of the system, an architecture of the connection line, a bandwidth of the connection line, a channel quality indication with respect to the system, a channel quality indication with respect to the connection line, a position of the user equipment, traffic requirements of a user, or quality of service requirements.

9. The system according to claim 1, wherein the scheduling unit is configured to generate the control message based on feedback information from the communication units.

10. The system according to claim 9, wherein the feedback information comprises a channel quality indicator with respect to the system or a channel quality indicator with respect to the connection line.

11. The system according to claim 9, wherein the control message indicates a level of amplification for each amplifying unit.

12. The system according to claim 1, wherein the scheduling unit is configured to assign the amplifying units to a configuration profile.

13. The system according to claim 1, wherein the scheduling unit is configured to schedule the communication units to be continuously active.

14. The system according to claim 1, wherein the system is based on electrical and optical components being integrated into a single or modular chip.

15. The system according to claim 1, wherein the control message indicates a split ratio for each of the connection units.

16. The system according to claim 1, wherein the scheduling unit is configured to schedule the amplifying units to be continuously active.

17. A method comprising:
distributing a communication signal of a user equipment via communication units, connection units, and amplifying units,
managing the communication signal via a communication management unit connected to the communication units via a connection line,
determining, via a scheduling unit, power loss corresponding to connection units that respectively connect the communication units to the connection line, wherein the determining is performed based on loss-inserting properties of the connection units, and
broadcasting, via the scheduling unit, a control message indicating which of the communication units, which of the connection units, and which of the amplifying units are to be activated, based on the power loss, wherein the control message further indicates whether each connection unit is to:
operate in a splitting mode in which the connection unit splits the communication signal between the communication unit corresponding to the connection unit and the connection line; or
operate in a bypass mode in which the connection unit is not connected to the communication unit and the communication signal upstream of the connection unit is provided to the connection line downstream of the communication unit.

18. The method according to claim 17, wherein based on a topology of a system, an architecture of the connection line, a bandwidth of the connection line, a channel quality indication with respect to the communication signal, a channel quality indication with respect to the connection line, a position of the user equipment, traffic requirements of a user, or quality of service requirements.

19. The method according to claim 17, further comprising generating the control message based on feedback information from the communication units.

20. The method of claim 17, wherein the control message indicates a split ratio for each of the connection units.

* * * * *